United States Patent
Seiber et al.

(10) Patent No.: US 6,853,667 B2
(45) Date of Patent: Feb. 8, 2005

(54) ELECTRODE DESIGN TO EXTEND SPUTTER LIFE OF A RING LASER GYROSCOPE

(75) Inventors: Bruce A. Seiber, Arden Hills, MN (US); Timothy J. Callaghan, Roseville, MN (US); Paul O. Rock, Clearwater, FL (US)

(73) Assignee: Honeywell International, Inc., Morristown, NJ (US)

( * ) Notice: Subject to any disclaimer, the term of this patent is extended or adjusted under 35 U.S.C. 154(b) by 232 days.

(21) Appl. No.: 09/878,894

(22) Filed: Jun. 11, 2001

(65) Prior Publication Data

US 2002/0186740 A1 Dec. 12, 2002

(51) Int. Cl.$^7$ ................................................. H01S 3/08
(52) U.S. Cl. ........................... 372/61; 372/107; 372/98; 372/99
(58) Field of Search .................... 372/61, 33; 29/602.1, 29/662

(56) References Cited

U.S. PATENT DOCUMENTS

| | | | |
|---|---|---|---|
| 4,158,821 A | | 6/1979 | Bresman |
| 4,320,321 A | * | 3/1982 | Alexandrov et al. ........ 313/618 |
| 4,672,624 A | * | 6/1987 | Ford ........................... 372/87 |
| 4,894,023 A | * | 1/1990 | Hall ............................ 439/278 |
| 4,896,816 A | * | 1/1990 | Lascar et al. ............. 228/124.6 |
| 5,248,636 A | * | 9/1993 | Davis et al. .................. 216/63 |
| 5,308,575 A | * | 5/1994 | Ford ........................ 264/1.21 |
| 5,422,272 A | * | 6/1995 | Papp et al. .............. 435/285.2 |
| 5,885,280 A | * | 3/1999 | Nettekoven et al. .......... 606/41 |
| 5,960,025 A | * | 9/1999 | Thorland et al. ........... 372/107 |
| 6,072,580 A | * | 6/2000 | Barnes et al. ............... 356/459 |
| 6,089,885 A | * | 7/2000 | Nickel ........................ 439/127 |
| 6,232,863 B1 | * | 5/2001 | Skinner et al. ............... 336/96 |
| 6,305,071 B1 | * | 10/2001 | Van Zeeland .............. 29/602.1 |

OTHER PUBLICATIONS

Frontpage of the Armada International: 1/00 located at website: http://www.armada.ch/e/1–00/front.htm (2 pages) Oct. 30, 2000.
Article by Doug Richardson, entitled: Navigating by Light in the Armada International: 1/00–002 located at website: http://www.armada.ch/e/1–00/002.htm—all pages Oct. 30, 2000.
International Search Report, date of mailing Nov. 5, 2002.

* cited by examiner

Primary Examiner—Don Wong
Assistant Examiner—Dung (Michael) T Nguyen
(74) Attorney, Agent, or Firm—Schiff Hardin LLP

(57) ABSTRACT

A gas discharge tube such as a ring laser gyroscope includes a block. A cathode has an inwardly extending foot that engages the block. Additionally, or alternatively, an insulator is arranged to inhibit shorting between plasma in the block and a flange of the cathode.

34 Claims, 3 Drawing Sheets

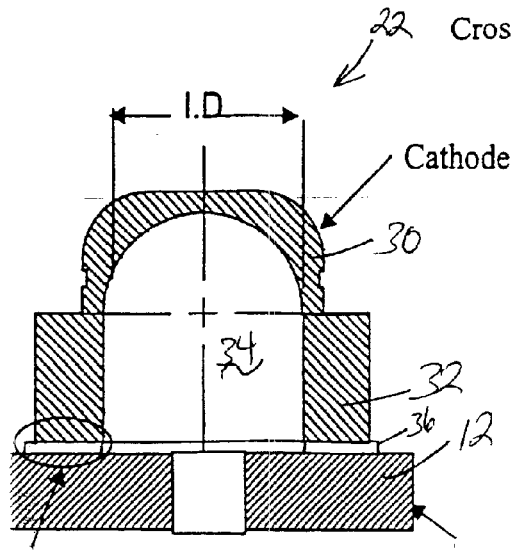
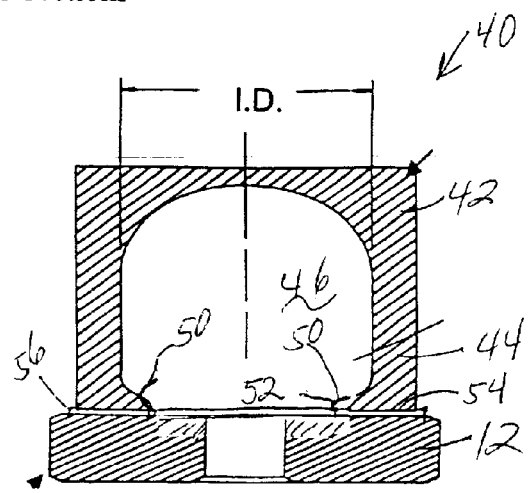
FIGURE 2
FIGURE 3
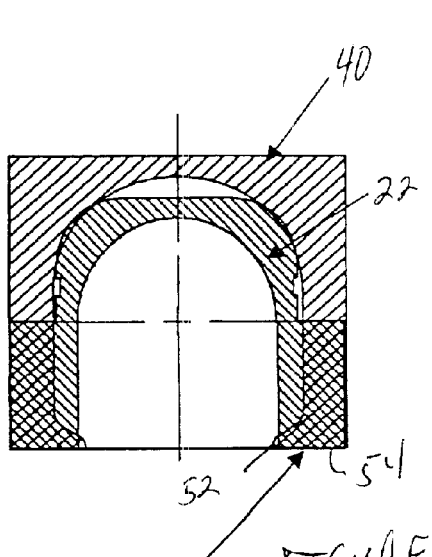
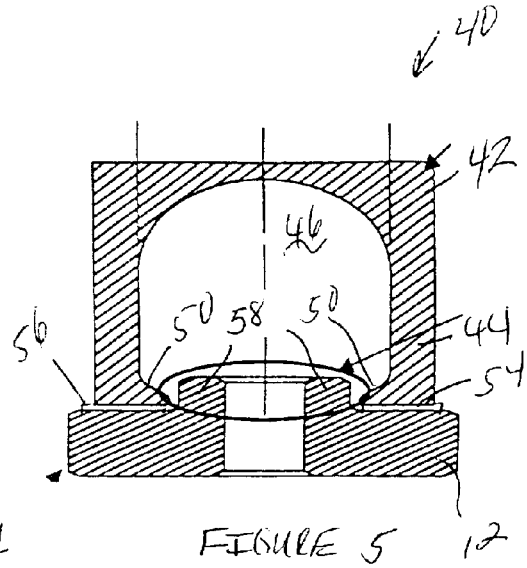
FIGURE 4
FIGURE 5

ELECTRODE DESIGN TO EXTEND SPUTTER LIFE OF A RING LASER GYROSCOPE

TECHNICAL FIELD OF THE INVENTION

The present invention relates to a cathode for a gas discharge tube such as a gas laser or a ring laser gyroscope.

BACKGROUND OF THE INVENTION AND PRIOR ART

Ring laser gyroscopes are frequently used to sense angular rates in order to guide and navigate a variety of vehicles such as airplanes, rockets, tanks, ships, submarines, drilling rigs, etc. As shown in FIG. 1, a ring laser gyroscope 10 is typically formed of a block 12 of material such as Zerodur® which has a low coefficient of thermal expansion. Accordingly, the block 12 is resistant to expansion over a wide temperature range. The block 12 is provided with an interior passage 14 that communicates with openings at each of its corners. Mirrors 16, 18, and 20 are provided at the corners with one of the mirrors 16, 18, and 20 being used as a read-out device. The interior passage 14 and the mirrors 16, 18, and 20 define a plasma chamber in the form of a closed laser resonant path.

A cathode 22 and anodes 24 and 26 engage corresponding surfaces of the block 12 at openings there through. The cathode 22 and the anodes 24 and 26 are coupled to an electrical source 28 so as to energize gas in order to form a laser plasma in the interior passage 14.

The cathode 22 as shown in FIG. 2 is a standard cathode. The cathode 22 has a dome 30 and a cylindrical wall 32. The dome 30 and the cylindrical wall 32 form a recess 34 that is part of the plasma discharge of the ring laser gyroscope 10. Accordingly, a portion of the plasma enters the recess 34. The cylindrical wall 32 is used to attach the cathode 22 to the block 12 of the ring laser gyroscope 10. The cathode 22 is suitably sealed by a seal 36 to the block 12 in order to contain the gas within the interior passage 14. The seal 36, for example, may be an indium seal. The anodes 24 and 26 may be similarly sealed to the block 12.

Gas ions bombard the cathode 22 during the running of the discharge in the ring laser gyroscope 10. This ion bombardment sputters metal off of the cathode 22. Also, the gas ions are initially held temporarily on the surface of the cathode 22 due to the biasing from the electrical source 28. The metal sputtered from the cathode 22 redeposits on cooler areas of the cathode 22 and on the block 12 next to the cathode 22. As the metal sputtered from the cathode 22 redeposits on the cathode 22, it over coats the gas ions held on the surface of the cathode 22. This trapping of the gas tends to decrease the life of the ring laser gyroscope 10 because it depletes the gas that is available to maintain lasing and the discharge.

The present invention is directed to a cathode design which decreases the current density over the cathode of a gas discharge tube and, therefore, decreases the sputter rate in order to increase the sputter life of a gas discharge tube.

SUMMARY OF THE INVENTION

In accordance with one aspect of the present invention, a gas discharge tube comprises a block and a cathode. The cathode has an inwardly extending foot, and the inwardly extended foot has a sole that engages the block.

In accordance with another aspect of the present invention, a ring laser gyroscope comprises a block, an anode, and a cathode. The block has a plasma supporting passage. The anode and cathode are coupled to the passage. The cathode comprises an inwardly extending foot having a sole, and the sole engages the block.

In accordance with still another aspect of the present invention, a gas discharge tube comprises a block, an anode, and a cathode. The block has a plasma cavity. The anode and cathode are coupled to the plasma cavity. The cathode comprises a foot having a sole and an inwardly extending toe, and the sole engages the block.

BRIEF DESCRIPTION OF THE DRAWINGS

These and other features and advantages will become more apparent from a detailed consideration of the invention when taken in conjunction with the drawings in which:

FIG. 2 illustrates a prior art cathode which is used with the ring laser gyroscope of FIG. 1;

FIG. 3 shows a cathode according to the present invention;

FIG. 4 is a comparison between the cathode of FIG. 2 and the cathode of FIG. 3;

FIG. 5 shows an insulator that reduces shorting between the cathode of FIG. 3 and the plasma of a ring laser gyroscope; and, FIG. 6 shows an alternative embodiment of the insulator shown in FIG. 4.

DETAILED DESCRIPTION

Figure 1:
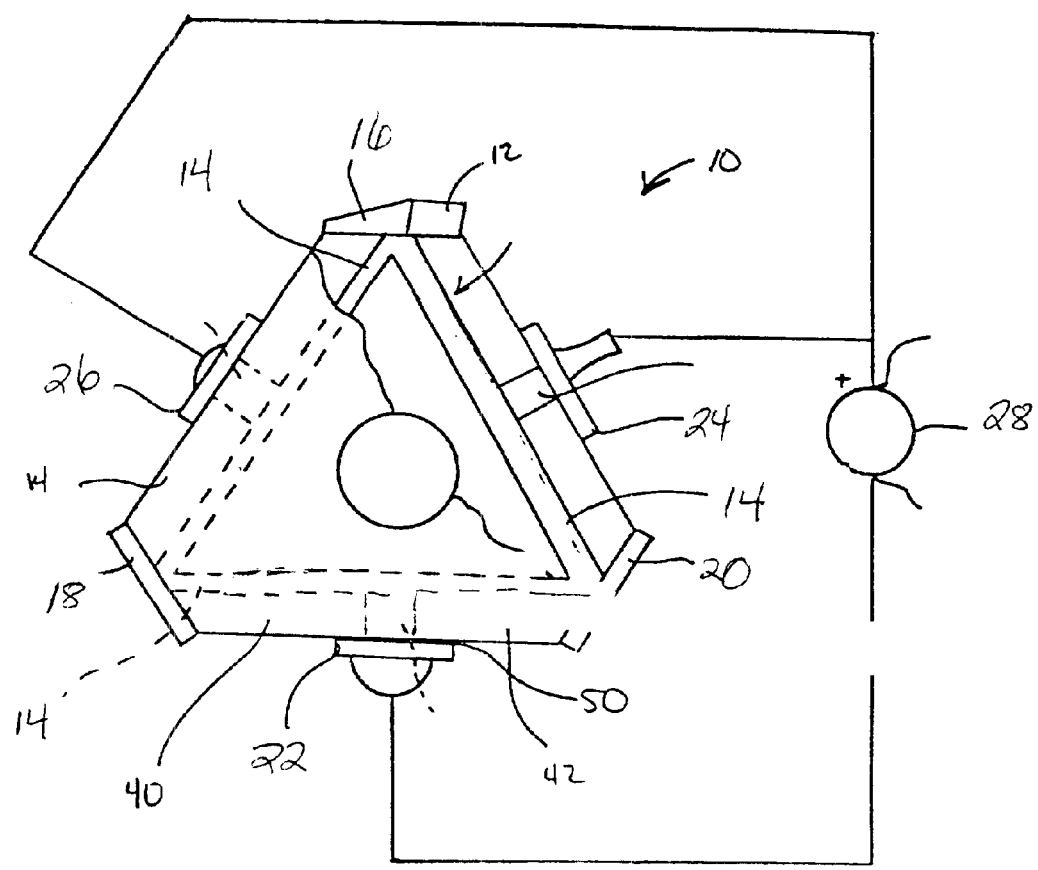
FIG. 1 illustrates a prior art ring laser gyroscope.

A cathode 40 according to the present invention is shown in FIG. 3. The cathode 40, which may be used on the ring laser gyroscope 10, has a dome 42 and a cylindrical wall 44. The dome 42 and the cylindrical wall 44 form a recess 46 that is part of a plasma discharge of a ring laser gyroscope.

The cylindrical wall 44 is provided with a foot 50 having an inwardly directed toe 52 and a sole 54. The sole 54 of the foot 50 abuts the block 12 through a seal 56, which may be an indium seal. The foot 50 with the inwardly directed toe 52 permits the inside diameter of the cylindrical wall 44 to be larger than the inside diameter of the cylindrical wall 32 of the cathode 22 shown in FIG. 2. A comparison between the cathodes 22 and 40 is shown in FIG. 4. This larger inside diameter of the cylindrical wall 44 lowers the current density and resulting sputter rate of the cathode 40 thus extending its sputter life as compared to the cathode 22.

At the same time, the foot 50 with the inwardly directed toe 52 allows the cathode 40 to have substantially the same seal area as the cathode 22, thus maintaining the life of the seal 56. Furthermore, the outside diameter around the cylindrical wall 44 of the cathode 40 may be substantially the same as the outside diameter around the cylindrical wall 32 of the cathode 22. Accordingly, the cathode 40 may be used in restricted spaces while still benefiting from the advantages discussed herein.

Additionally or alternatively, an insulator 58 extending from the block 12 into the recess 46 may be provided as shown in FIG. 5. The insulator 58 reduces shorting between the plasma in the discharge of the ring laser gyroscope 10 and the inwardly directed toe 52 of the foot 50. As shown in FIG. 5, the insulator 58 may be formed as a ring-type extension of the block 12. Also, as shown in FIG. 5, the inwardly directed toe 52 of the foot 50 is separated from the insulator 58 by a space.

Figure 6:
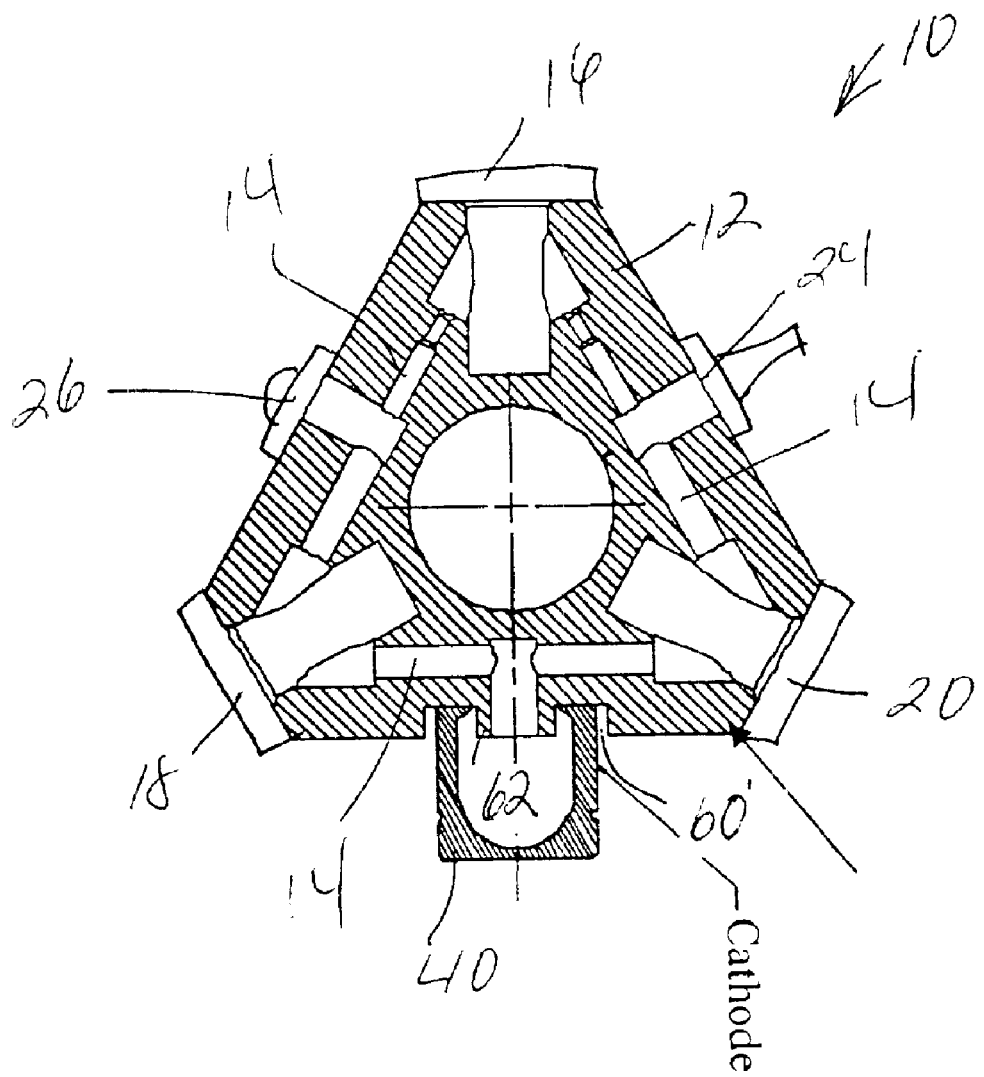

Alternatively, a recess 60 may be formed in the block 12 of the ring laser gyroscope 10 as shown in FIG. 6. This recess 60 receives the foot 50 at the end of the cylindrical wall 44 of the cathode 40 so that a portion 62 of the block 12, encircled by the recess 60, sufficiently extends into the recess 46 in order to reduce or inhibit shorting between the plasma and the inwardly directed toe 52 of the foot 50.

The cathode 40 as described above decreases the sputter rate thereby increasing the sputter life of the ring laser gyroscope 10 by decreasing the current density of the gas ions on the surface of the cathode 40. Accordingly, the sputter rate decreases which traps less gas and thereby increases sputter life.

Certain modifications of the present invention have been discussed above. Other modifications will occur to those practicing in the art of the present invention. For example, the block 12 need not have a triangular shape as shown in FIGS. 1 and 6 but instead may have other shapes such as a square or rectangular shape.

Also, the present invention has been described above particularly in the context of a ring laser gyroscope. However, the present invention may be practiced in the context of other gas discharge tubes such as gas lasers.

Moreover, the present invention has been described above in terms of a cylindrical cathode. However, the present invention also applies to other cathodes such as spherical cathodes, oval cathodes, etc.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A gas discharge device comprising:
   a block arranged to support a gas discharge; and,
   a cathode having an inwardly extending foot, wherein the inwardly extended foot has a sole that engages the block.

2. The gas discharge device of claim 1 wherein the cathode has a cylindrical wall, and wherein the inwardly extending foot is circumferential at an end of the cylindrical wall.

3. The gas discharge device of claim 2 wherein the inwardly extending circumferential foot permits the cathode to have a larger inside diameter as compared to a standard cathode.

4. The gas discharge device of claim 1 wherein the inwardly extending foot permits the cathode to have a larger inside perimeter as compared to a standard cathode.

5. The gas discharge device of claim 1 further comprising an insulator adjacent the inwardly extending foot, wherein the insulator is arranged to inhibit shorting between plasma and the inwardly extending foot.

6. The gas discharge device of claim 5 wherein the inwardly extended foot has a toe, and wherein the insulator and the toe are spatially separated.

7. The gas discharge device of claim 5 wherein the insulator is an extension of the block.

8. The gas discharge device of claim 5 wherein the block comprises a recess defining the insulator, wherein the recess comprises a well having sides substantially surrounded by the block, and wherein the inwardly extending foot is received in the recess of the block.

9. The gas discharge device of claim 5 wherein the cathode has a cylindrical wall, and wherein the inwardly extending foot is circumferential at an end of the cylindrical wall.

10. The gas discharge device of claim 5 wherein the inwardly extending foot permits the cathode to have a larger inside diameter as compared to a standard cathode.

11. The gas discharge device of claim 1 further comprising a seal between the sole and the block.

12. A ring laser gyroscope comprising:
   a ring laser gyroscope block having a closed loop plasma supporting passage;
   an anode coupled to the passage; and,
   a cathode coupled to the passage, wherein the cathode comprises an inwardly extending foot having a sole, and wherein the sole engages the ring laser gyroscope block.

13. The ring laser gyroscope of claim 12 further comprising a seal, wherein the sole engages the ring laser gyroscope block through the seal.

14. The ring laser gyroscope of claim 13 wherein the cathode has a cylindrical wall, and wherein the inwardly extending foot is circumferential at an end of the cylindrical wall.

15. The ring laser gyroscope of claim 13 wherein the inwardly extending foot permits the cathode to have a larger inside diameter and substantially the same seal area as compared to a standard cathode.

16. The ring laser gyroscope of claim 12 wherein the inwardly extending foot permits the cathode to have a larger inside perimeter as compared to a standard cathode.

17. The ring laser gyroscope of claim 12 further comprising an insulator adjacent the inwardly extending foot, wherein the insulator is arranged to inhibit shorting between plasma and the inwardly extending foot.

18. The ring laser gyroscope of claim 17 wherein the inwardly extended foot has a toe, and wherein the insulator and the toe are spatially separated.

19. The ring laser gyroscope of claim 17 wherein the insulator is an extension of the ring laser gyroscope block.

20. The ring laser gyroscope of claim 17 wherein the block comprises a recess defining the insulator, wherein the recess comprises a well having sides substantially surrounded by the block, and wherein the inwardly extending foot is received in the recess of the ring laser gyroscope block.

21. The ring laser gyroscope of claim 17 wherein the cathode has a cylindrical wall, and wherein the inwardly extending foot is circumferential at an end of the cylindrical wall.

22. The ring laser gyroscope of claim 17 wherein the inwardly extending foot permits the cathode to have a larger inside diameter as compared to a standard cathode.

23. A gas discharge device comprising:
   a block having a plasma cavity;
   an anode coupled to the plasma cavity; and,
   a cathode coupled to the plasma cavity, wherein the cathode comprises a foot having a sole and an inwardly extending toe, and wherein the sole engages the block.

24. The gas discharge device of claim 23 wherein the cathode has a cylindrical wall, and wherein the inwardly extending foot is circumferential at an end of the cylindrical wall.

25. The gas discharge device of claim 24 wherein the circumferential foot permits the cathode to have a larger inside diameter as compared to a standard cathode.

26. The gas discharge device of claim 23 wherein the foot permits the cathode to have a larger inside perimeter as compared to a standard cathode.

27. The gas discharge device of claim 23 further comprising an insulator adjacent the inwardly extending foot, wherein the insulator is arranged to inhibit shorting between plasma and the toe of the foot.

28. The gas discharge device of claim 27 wherein the insulator and the toe are spatially separated.

29. The gas discharge device of claim 23 further comprising a seal, wherein the sole engages the block through the seal.

30. The gas discharge device of claim 1 wherein the foot of the cathode has a toe, wherein the toe is inwardly extending, and wherein the cathode including the toe and the foot is metal.

31. The gas discharge device of claim 1 wherein cathode including the foot is metal.

32. The ring laser gyroscope of claim 12 wherein the foot of the cathode has a toe, wherein the toe is inwardly extending, and wherein the cathode including the toe and the foot is metal.

33. The ring laser gyroscope of claim 12 wherein cathode including the foot is metal.

34. The gas discharge device of claim 23 wherein the cathode including the toe and the foot is metal.

* * * * *